UNITED STATES PATENT OFFICE.

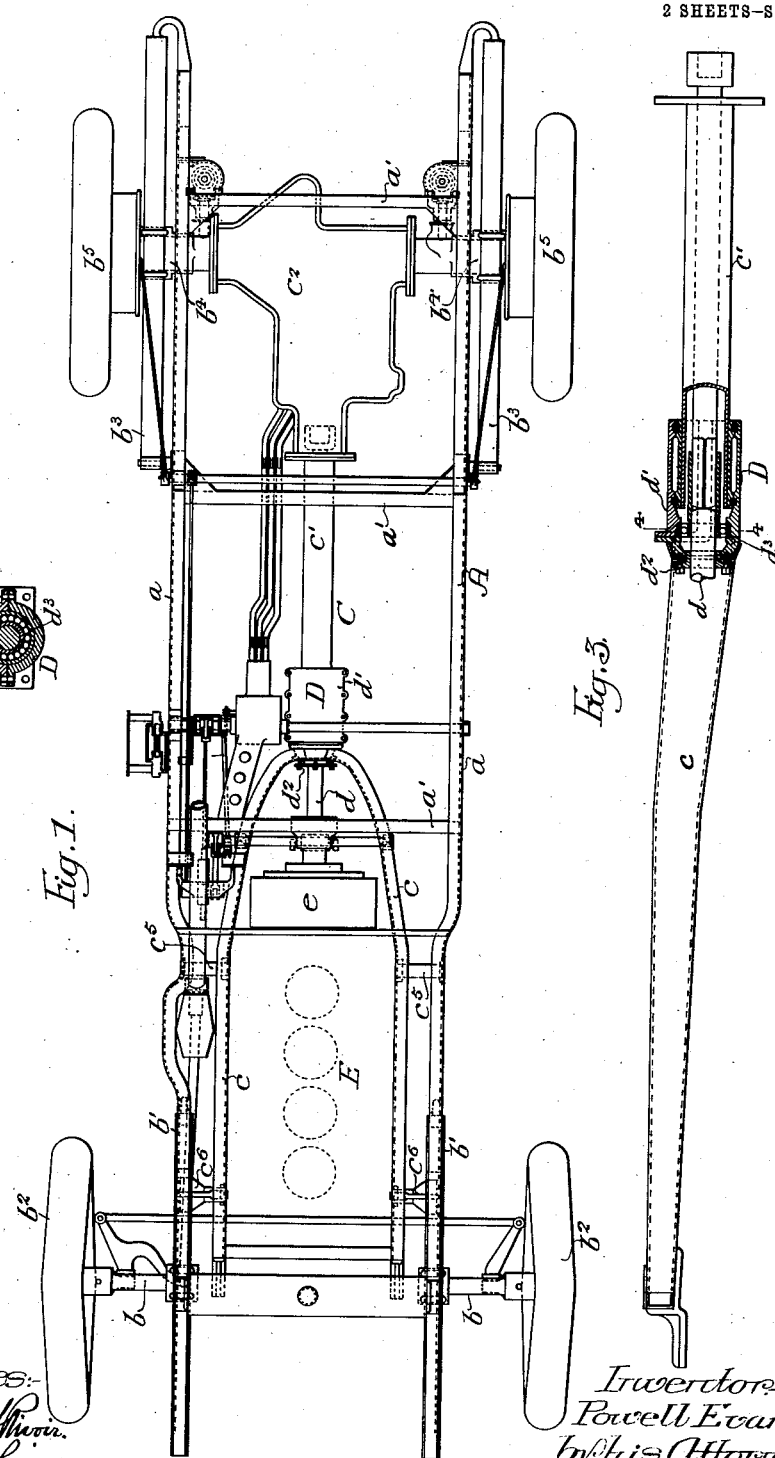

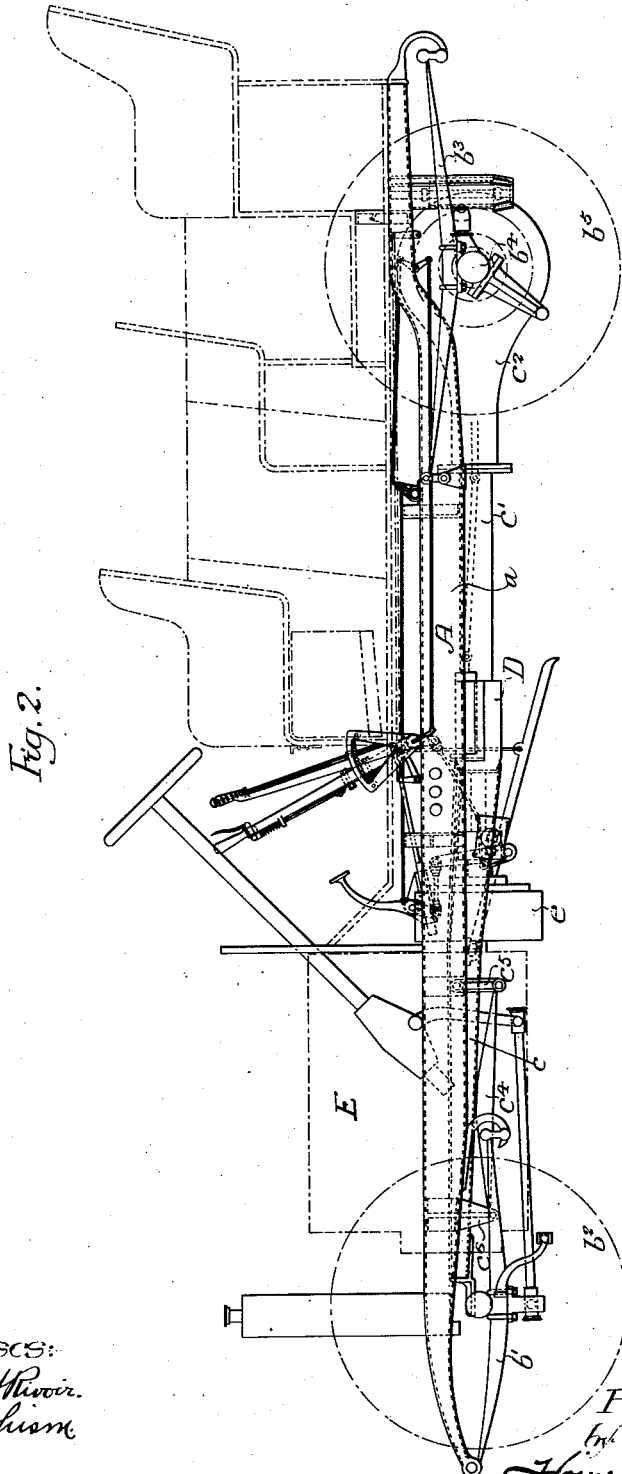

POWELL EVANS, OF PHILADELPHIA, PENNSYLVANIA.

MOTOR-VEHICLE FRAME.

1,021,512.   Specification of Letters Patent.   Patented Mar. 26, 1912.

Application filed May 7, 1907. Serial No. 372,332.

*To all whom it may concern:*

Be it known that I, POWELL EVANS, a citizen of the United States, residing in Philadelphia, Pennsylvania, have invented certain Improvements in Motor - Vehicle Frames, of which the following is a specification.

One object of my invention is to provide a structure for supporting the motor of a motor vehicle, so arranged and constructed that the transmission of vibration from the motor to the body of the vehicle shall be in a great measure prevented; it being also desired to so support the motor that it shall be free to turn relatively to the main frame of the structure, the construction being such as to interpose what is in effect, a shock absorbing connection between the motor and the main frame.

Another object of the invention is to provide a motor vehicle with main and auxiliary frames, of which the main frame is connected to the front axle through a pair of springs and the auxiliary frame is connected to the main frame through a second set of springs, the motor being carried upon said auxiliary frame.

A further object of the invention is to provide means for supporting the motor at a point or points substantially under its center of gravity so that while it is in operation little or none of its weight is sustained as a dead weight by the rear axle. By this means I do away in a great measure with what has heretofore been found a very serious cause of the wear on the rear tires.

These objects and other advantageous ends I attain as hereinafter set forth, reference being had to the accompanying drawings, in which—

Figure 1, is a plan of the chassis of a motor vehicle illustrating my invention as applied thereto; Fig. 2, is a side elevation of the structure shown in Fig. 1; Fig. 3, is a side elevation on an enlarged scale, and partly in section, illustrating the detail construction of the auxiliary frame, and Fig. 4, is a vertical section taken on the line 4—4, Fig. 3.

In the above drawings, $a$ represents the longitudinal or side members of the main frame A and these are connected at intervals by suitable transverse members $a'$. The front portion of said frame is supported on the front axle $b$ through a pair of springs $b'$, said axle being provided with a pair of wheels $b^2$ mounted in the customary manner. The rear portion of the frame A is mounted upon springs $b^3$ resting upon suitable portions of the rear axle $b^4$ which is provided with wheels $b^5$.

The auxiliary frame C consists of a substantially U-shaped front section $c$ whose free ends extend toward the front of the machine and whose rear portion is connected through a swivel joint D to the tubular member $c'$, whose rear end is in turn rigidly connected to an inclosed casing $c^2$ supported upon the rear axles $b^4$ so as to be free to turn upon them as an axis. This casing contains the differential and transmission gears, while the main engine shaft $d$ extends through the structure D and through the tubular member $c'$ into said casing, where it is connected to the mechanism therein contained.

The structure D consists of an outer casing $d'$ rigidly connected to the U-shaped section $c$ of the auxiliary frame and is mounted upon the member $c'$ so as to be free to turn thereon, as shown in Fig. 3. At the point where the main engine shaft passes into the tubular member $c'$ through the structure D, I provide a stuffing box $d^2$, placing also ball bearings $d^3$ of any desired type between the shaft and said structure D. The free ends of the U-shaped portion $c$ of the auxiliary frame C are hung from the adjacent side members $a$ of the main frame A, through springs $c^4$.

As shown in Fig. 2, each of the arms of the section $c$ has under it one of the springs $c^4$ which is so arranged that its ends are hung from the side members $a$ through tension members $c^5$ and $c^6$.

As indicated in dotted lines at E, the motor for the vehicle is mounted upon the portion $c$ of the auxiliary frame so that it is supported practically at its center of gravity and is connected to its main shaft through any suitable form of clutch (not shown.) A fly wheel $e$ is provided upon the main shaft $d$ between the motor and the stuffing box $d^2$.

With the above described arrangement of parts it is obvious that there are two pairs of springs interposed between the motor and the front axle $b$, for said motor is mounted upon the section $c$ of the auxiliary frame, which is hung from the main frame through the springs $c^4$. The main frame is in turn supported upon the front axle through the springs $b'$. With this arrangement, the motor with the section $c$ of the auxiliary frame is free to move independently of the main frame and it may also turn to a limited extent upon the tubular member $c'$ of the auxiliary frame through the swivel joint D. Moreover that part of said auxiliary frame upon which is carried the motor is hung almost entirely from the front part of the main frame so that the rear tires are relieved of by far the greater part of a weight which, in certain types of cars to which my invention is especially applicable has heretofore been carried by them.

By employing the springs $c^4$, I am enabled to dispense with the use of a turning joint between the auxiliary frame and the main frame or the front axle, and it is also to be noted that this pair of springs acts as a shock absorbing joint, since not only are the vibrations of the engine absorbed by them so as not to be transmitted to the main frame, but any undue movement of the front axle relatively to the main frame is not transmitted to the motor.

I claim:—

1. The combination of the front and rear axles; a main frame; springs respectively mounted between the axles and said frame; an auxiliary frame consisting of a gear case rotatably mounted on the rear axle, a tubular shaft container rigidly connected to the gear case, a casing rotatably mounted on the forward end of said container, a substantially U-shaped frame section rigidly fixed to said casing and having its arms extended substantially parallel with the side members of the main frame; and springs respectively mounted between said side members and the arms of the U-shaped frame section.

2. The combination of the front and rear axles; a main frame; springs respectively mounted betwen the axles and said frame; an auxiliary frame consisting of a gear case rotatably mounted on the rear axle, a tubular shaft container rigidly connected to the gear case, a substantially U-shaped frame section rotatably mounted on said container and having its arms extended substantially parallel with the side members of the main frame; a pair of tension members hung from the forward parts of each of said side members; with a spring hung from each pair of tension members and supporting one of the arms of the U-shaped frame section.

In testimony whereof, I have signed my name to this specification, in the presence of two subscribing witnesses.

POWELL EVANS.

Witnesses:
   Wm. E. Water,
   Maurice G. Thomas.